United States Patent Office 3,574,167
Patented Apr. 6, 1971

3,574,167
NITROGENOUS POLYESTER-ETHER POLYOLS AND POLYURETHANES PREPARED THEREFROM
Leslie Catron Case and Laura Kaiser Case, both of 14 Lockeland Road, Winchester, Mass. 01890
No Drawing. Continuation-in-part of application Ser. No. 803,975, Mar. 3, 1969, which is a division of application Ser. No. 532,116, Mar. 7, 1966, now Patent No. 3,454,530, which is a continuation-in-part of applications Ser. No. 168,062, Jan. 23, 1962, Ser. No. 188,842, Apr. 19, 1962, Ser. No. 456,816, May 18, 1965, Ser. No. 485,932, Sept. 8, 1965, Ser. No. 611,826, Jan. 26, 1967, now Patent No. 3,502,601, and Ser. No. 665,005, Aug. 21, 1967, now Patent No. 3,483,169. This application May 19, 1969, Ser. No. 825,997
Int. Cl. C08g 22/06, 22/08
U.S. Cl. 260—75      24 Claims

ABSTRACT OF THE DISCLOSURE

Novel polyurethane compositions which are derived from novel nitrogenous polyester-ether polyols are described. These polyols are prepared by coreacting aminoalcohols, optionally aliphatic polyalcohols, cyclic anhydrides of alicyclic and/or aromatic polycarboxylic acids, and epoxides or oxetanes.

CROSS-REFERENCES TO RELATED APPLICATIONS

This application is a continuation-in-part of our application Ser. No. 803,975, filed Mar. 3, 1969, now abandoned, which is a divisional application of our application Ser. No. 532,116, filed Mar. 7, 1966, now U.S. Pat. No. 3,454,530, issued July 8, 1969, which is a continuation-in-part of our application Ser. No. 168,062, filed Jan. 23, 1962, now abandoned, Ser. No. 188,842, filed Apr. 19, 1962, now abandoned, Ser. No. 456,816, filed May 18, 1965, now abandoned, and Ser. No. 485,932, filed Sept. 8, 1965, now abandoned, and applications Ser. No. 611,826, filed Jan. 26, 1967, now U.S. Pat. No. 3,502,601, issued Mar. 24, 1970, and Ser. No. 665,005, filed Aug. 21, 1967, now U.S. Pat. No. 3,483,169, issued Dec. 9, 1969.

BACKGROUND OF THE INVENTION

(1) Field of the invention

This invention relates to novel polyurethane compositions derived from fluid nitrogen-containing polyester-ether polyols. More particularly, this invention is concerned with novel, rigid polyurethane foams possessing improved dimensional stability under adverse conditions of temperature and humidity, greater toughness and superior flame retardancy. The polyurethane compositions of the instant invention are prepared from novel polyols which are synthesized by coreacting alkanolamines or admixtures of alkanolamines with aliphatic polyols, cyclic monoanhydrides of aromatic and/or carbocyclic polycarboxylic acids, especially those containing halogen substituents, and alkylene oxides.

(2) Description of the prior art

Polyurethane compositions are generally derived from the crosslinking reaction of an organic polyisocyanate and a polymer having terminal hydroxyl groups, commonly referred to as a polyol, and many suitable polyols and formulations are known. Polyols most frequently employed in polyurethane formulations belong to the broad class of polyether polyols and polyester polyols. Polyether polyols are generally prepared by the base-catalyzed addition polymerization of alkylene oxides. The preparation of polyester polyols by polycondensation techniques in which dicarboxylic acids, or their anhydrides, are reacted together with polyalcohols, primarily glycols, by heating, if desired in the presence of an acidic catalyst, with removal of the water formed in the condensation reaction, is thoroughly documented in the art. The preparation of polyester polyols by transesterification of a dialkyl ester of a dibasic acid with a polyalcohol, desirably in the presence of a catalyst, is also described in the art. These standard polyester polyols are composed of units of the formula —R—O— alternating with carboxylic acid or anhydride residues of the formula

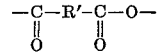

in a 1:1 unit ratio. Such conventional polyesters which possess a chemically combined ratio of —R—O— units to

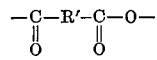

units of about 1:1, and which, in addition to a minor amount of aromatic dicarboxylic acid residues, contain substantial amounts of relatively expensive aliphatic dicarboxylic acid residues have also been prepared by coreacting monoepoxides with dicarboxylic acid anhydrides in the presence of strongly basic catalysts as detailed in U.S. Pats. 2,779,783 and 3,254,060, or by a process described in U.S. Pat. 3,089,863, or by other specialized techniques.

In order to be useful in commercial polyurethane formulations, polyols must be compatible with the other components of the polyurethane formulation, such as polyisocyanates, blowing agents, etc., and they must possess viscosities which are sufficiently low at or near room temperature to be readily and thoroughly miscible with these other components. Such ready miscibility is essential for the production of good quality foams with uniform pore structure. When commercial foaming equipment or spray gun techniques are employed, relatively low room temperature viscosities are particularly desirable in order to avoid the inconvenience of preheating procedures which are cumbersome and expensive, and which preclude the use of conventional low-boiling blowing agents. Polyesters prepared solely from inexpensive aromatic or alicyclic polycarboxylic acids, or their anhydrides, possess very high viscosities, or are even glassy solids at room temperature, and the viscosity restrictions imposed by standard foaming techniques, customary low-boiling blowing agents, and conventional foaming process equipment have thus far prevented the preparation of commercially acceptable foams from polyester polyols derived exclusively from inexpensive aromatic acids, such as phthalic acid or tetrahalophthalic acids. Moreover, polyester polyols based entirely on such cyclic polycarboxylic acids lack the requisite compatibility with the polyisocyanates and blowing agents in common use. Thus, although British Pat. 873,974 describes the preparation of rigid polyurethane foams from polyesters derived from a chlorinated alicyclic acid, these polyester polyols are solids at room temperature and cannot be used without resorting to a preheating step. The special blowing techniques which have to be employed at the elevated temperatures required to transform the solid polyol to a liquid state result in brittle foams with poor thermal insulation properties.

Even though polyurethane compositions have found numerous commercial end uses, their flammability and combustibility have limited and, in some instances altogether prevented, use of these materials in many applications. The prior art describes attempts to provide compositions with improved resistance to ignition and flame propagation. Specifically the use of additives such as compounds of phosphorous, antimony, and bismuth to impart flame resistance has been described. Many of these additives are quite toxic, however, and they are often immiscible with the other components of the formulation.

The incorporation of phosphoro, chloro, or bromo radicals as an integral part of the polyol structure has also been found to be very effective in increasing the flame resistance of the cross-linked polyurethane compositions prepared therefrom. The ready availability of suitable monomers possessing significant amounts of halo substituents is severely limited, however. In view of their high halogen content, the use of substantial amounts of readily available halogenated aromatic and carboxylic polycarboxylic acids, such as tetrachlorophthalic acid or tetrabromophthalic acid, for example, would be of value in the preparation of polyurethane polyols. As outlined herein-above, however, such polyesters possess intolerably high viscosities and poor compatibility with other formulation components.

SUMMARY OF THE INVENTION

It is an objective of the present invention to provide novel polyurethane compositions, and especially rigid polyurethane foams, which are prepared from novel polyols containing aromatic or alicyclic dicarboxylic acid residues in substantial proportion by weight, yet quite unexpectedly possess viscosities which are sufficiently low at room temperature to allow the preparation of a polyurethane formulation without resorting to a preheating step. It is a further objective of the present invention to provide polyurethane compositions which possess a high degree of flame retardancy yet which are derived from relatively inexpensive, readily available materials of commerce. It is yet another principal objective of the present invention to provide, at a savings in cost over presently known formulations, rigid polyurethane foams possessing increased hydrolytic and thermal stability, and improved dimensional stability when subjected to cold temperatures or to elevated temperatures and humidity. It is also an objective of the present invention to furnish novel methods for the production of polyols which have an exceptionally high content of halo radical substituents in the polyol structure.

The novel polyurethane compositions provided by the present invention are prepared from fluid poly-(ester-ether) polyols having functionalities ranging from two to about seven, and preferably from three to about five. Quite surprisingly, the viscosities of these polyols will generally be less than one million centipoises and will frequently be less than 500,000 centipoises, and will be less than 200,000 centipoises in the most desirable instances. The number average molecular weight of polyols useful in the present invention will range from at least 300 and preferably at least 400, to generally not more than 1250, and the hydroxyl equivalent weight, that is, the molecular weight per hydroxyl chain end will vary from at least 90, and preferably from at least 125, to about 300. Suitable polyols are further characterized by having an acid number of less than five, and usually less than two. The acid number is the number of milligrams of potassium hydroxide necessary to neutralize the acidity of one gram of polyol.

One class of novel polyols which are employed to prepare the novel polyurethane compositions of the present invention comprise compositions in which each polymer molecule contains at least one nitrogen atom as a centrally located core, or branch point, having attached thereto essentially linear hydroxyl-terminated polymer branch chains composed of lower saturated aliphatic cyclic ether residues and cyclic monoanhydride residues. Polyols within the scope of this embodiment are selected from the group consisting of poly-(ester-ether) polyols characterized by the general formulae: N(Q—R—OH)$_3$,

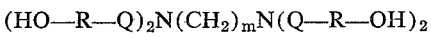

and

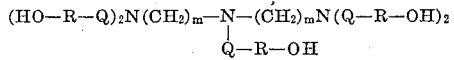

wherein N is a nitrogen atom, R is a saturated lower aliphatic 1,2-alkylene radical having from two to six carbon atoms, OH is a terminal hydroxyl radical, Q is an ester-ether polymer chain, and $m$ is an integer having a value of two or three. The polymer chains, Q, attached to the nitrogen branch points are essentially composed of (X) saturated lower aliphatic radicals of the formula —R—O—, derived from a cyclic monoether by a ring-opening reaction and hereinafter referred to as oxyalkylene radicals, wherein R is selected from the group consisting of saturated aliphatic 1,2-alkylene radicals of from two to six carbon atoms, and saturated aliphatic 1,3-alkylene radicals of from three to seven carbon atoms, and (Y) anhydride residues of the general structural formula

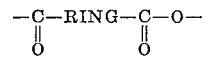

which are derived by a ring-opening reaction from a cyclic monoanhydride of the formula

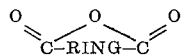

having from 8 to 14 carbon atoms, wherein RING represents a cyclic hydrocarbon radical selected from the group consisting of aromatic and cycloaliphatic radicals having from six to twelve carbon atoms. The mol ratio of the —O—R— radicals to the cyclic hydrocarbon radicals, —RING—, in the polyol will vary from about 2.0 to about ten, and the arrangement of the X and Y members within the polymer chain is largely random, except that in order to be suitable for the preparation of the polyurethanes of the present invention it is an essential requirement that at least about 90 percent, and advisably at least 95 percent of the polymer molecules of these novel polyols have at least two of the —O—R— radicals attached directly through carbon to the central nitrogen branch atom, that is, that they have the general core structure —N—(C—C—O—)$_2$, with the third valence of the central nitrogen being satisfied by a third —O—R— radical or by a cyclic anhydride residue of the structure described herein. The polyols may contain a small proportion of polymer molecules having the general core structure —NH—(C—C—O—) with the other nitrogen valence being satisfied by an anhydride residue, but the amount of such polymer molecules should advisably be less than about ten percent and preferably be less than five percent of the polyol composition.

Polyurethane compositions having exceptionally high halogen content are prepared according to the present invention from polyols composed essentially of at least one percent, and preferably of at least five percent, of compositions having the general formula N(Q—R—OH)$_3$ with the remainder being constituted by compositions represented by the general formula Z(Q—R—OH)$_f$ wherein N, Q, R, OH, and $m$ have the meaning assigned herein-above, and Z is a hydrocarbon residue attached to the hydroxyl radicals of a saturated aliphatic monomeric polyalcohol having at least three carbon atoms and at least three hydroxyl radicals and $f$ is the functionality of said aliphatic monomeric polyalcohol and is an integer having a value of at least three. The ester-ether polymer chains, Q, are composed in a random arrangement of —R—O— radicals and

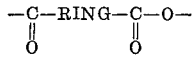

residues wherein R and RING have the meaning defined hereinabove, with the mol ratio of —R—O— radicals to —RING— radicals in the polyol varying from at least 1.5 and preferably at least 2.0 to about 10.

The novel polyols contemplated for use in preparing the polyurethane compositions of the present invention are readily prepared by coreacting in intimate admixture (1) a cyclic monoether selected from the group consisting of saturated lower aliphatic monoepoxides and monooxetanes, (2) a cyclic monoanhydride of an organic dicarboxylic acid selected from the group consisting of aromatic and cycloaliphatic dicarboxylic acids having at least eight carbon atoms and having both carboxylic acid groups attached directly to cyclic hydrocarbon radicals, and (3) a polymerization starter having at least three active hydrogen atoms and being selected from the group consisting of alkanolamines having from one to four nitrogen atoms and from three to six active hydrogen atoms, hydroxyalkylene ethers of said alkanolamines, and admixtures of said alkanolamines with saturated aliphatic polyalcohols having from three to six carbon atoms and from three to six hydroxyl radicals.

DESCRIPTION OF THE PREFERRED EMBODIMENTS

The preferred polyurethane compositions are prepared from polyols in which —RING— is a cyclic hydrocarbon radical selected from the group consisting of 1,2-phenylene, 3,4,5,6-tetrachloro-1,2-phenylene, 3,4,5,6-tetrabromo-1,2-phenylene, and 1,4,5,6,7,1-hexachlorobicyclo-(2,2,1)-2,3-heptenylene-5, and R is a saturated aliphatic radical selected from the group consisting of 1,2-ethylene, 1,2-propylene, 3-chloro-1,2-propylene, 3-bromo-1,2-propylene, 1,2-butylene, 2,2-bis(chloromethyl)-1,3-propylene, and 2,2-bis(bromomethyl)-1,3-propylene. Particularly preferred are polyols in which —RING— is an aromatic radical selected from the group consisting of 1,2-phenylene, 3,4,5,6 - tetrachloro-1,2-phenylene, 3,4,5,6 - tetrabromo-1,2-phenylene and R is a saturated lower aliphatic 1,2-alkylene radical selected from the group consisting of 1,2-ethylene and 1,2-propylene.

Cyclic monoethers which are desirable in preparing the polyurethane polyols of the present invention comprise 1,2-alkylene oxides, generally known as epoxides and 1,3-alkylene oxides, generally known as oxetanes or trimethylene oxides. Preferred for use are saturated lower aliphatic terminal monoepoxides having from two to six carbon atoms and from zero to three halogen substituents selected from the group consisting of chloro and bromo radicals, and having the general structural formula

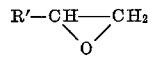

wherein R' is a radical selected from the group consisting of hydrogen, lower aliphatic radicals and lower aliphatic haloalkyl radicals.

Preferred oxetanes will have from three to ten carbon atoms and from zero to six halogen substituents selected from the group consisting of chloro and bromo radicals.

Representative of the cyclic monoethers which are preferred for use in the present invention are such epoxides as ethylene oxide, propylene oxide, 1,2-butylene oxide, 3-chloro-1,2-propylene oxide, also known as epichlorohydrin, 3-bromo-1,2-propylene oxide, also known as epibromohydrin, and oxetanes, such as trimethylene oxide, 3,3-dimethyloxetane, 3,3-bis(chloromethyl) oxetane, 3,3-bis (bromomethyl) oxetane, and the like. Especially preferred for use in the present invention are ethylene oxide and propylene oxide. Propylene oxide is most preferred.

Mixtures of cyclic monoethers may be employed. Especially useful are mixtures of two or more epoxides.

Cyclic monoanhydrides suitable for preparing the polyols preferred for use in the polyurethane compositions of this invention are those having from 8 to 14 carbon atoms and from zero to six halogen radicals selected from the group consisting of chloro and bromo radicals, and having the general structural formula

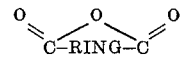

wherein RING is a cyclic hydrocarbon radical selected from the group consisting of aromatic and cycloaliphatic radicals having from six to 12 carbon atoms and from zero to six chloro to bromo atoms. While iodo-substituted anhydrides can be employed, these are not desirable because they are expensive and may result in excessive discoloration of the final composition especially in the presence of light.

Representative of the cyclic monoanhydrides which are very useful in the present invention are phthalic anhydride, 3,4,5,6-tetrachlorophthalic anhydride, 3,4,5,6-tetrabromophthalic anhydride, and 1,4,5,6,7,7-hexachlorobicyclo-(2,2,1)-5-heptene-,2,3-dicarboxylic acid anhydride (hereinafter referred to as Chlorendic anhydride) and 2,2'-diphenylene dicarboxylic acid anhydride (hereinafter referred to as diphenic acid anhydride). Also useful are such anhydrides as hexahydrophthalic anhydride, endo-cis-bicyclo-(2,2,1)-5-heptene-2,3-dicarboxylic acid anhydride, (sometimes referred to as Nadic anhydride), its methyl substituted derivatives, (sometimes referred to as Methyl Nadic anhydride) and bicyclic adducts of maleic anhydride or tetrahydrophthalic anhydride with cyclic aliphatic diolefins, such as cyclopentadiene, hexachlorocyclopentadiene, and hexabromocyclopentadiene. Particularly preferred for use in the present invention are phthalic anhydride, tetrachlorophthalic anhydride, and tetrabromophthalic anhydride. Mixtures of two or more of these cyclic dicarboxylic acid anhydrides can, of course, be utilized.

Because of their high halogen contents, chlorendic anhydride, tetrachlorophthalic anhydride and tetrabromophthalic anhydride are highly useful in the formation of polyols for polyurethanes with flame retardation and self-extinguishing properties. When prepared according to the present invention, polyols incorporating such halogenated anhydrides quite surprisingly exhibit relatively low melt viscosities. Prior to the present invention, halogenated dicarboxylic acids and anhydrides did not readily enter into polyester formation and yielded compositions with undesirably dark colors and very high viscosities.

Starters useful in the preparation of polyols suitable for preparing the polyurethanes of the present invention comprise alkanolamines, hydroxyalkylene ethers thereof, and admixtures of alkanolamines with aliphatic polyalcohols. Useful starters will have an active hydrogen functionality of at least three. Examples of useful polymerization starters include diethanolamine, diisopropanolamine, triethanolamine and hydroxyethers thereof, triisopropanolamine and hydroxyethers thereof, tetrakis(hydroxyethyl)ethylene diamine, tetrakis(hydroxypropyl)ethylene diamine, pentakis(hydroxyethyl)diethylenetriamine, pentakis(hydroxypropyl)diethylene triamine, hexakis(hydroxyethyl)triethylene tetramine, hexakis(hydroxypropyl) triethylene tetramine, tris(hydroxyethyl)aminoethyl piperazine, tris(hydroxypropyl)aminoethyl piperazine, and the like.

Alkanolamines having an active average hydrogen functionality of three or four are especially preferred, with a functionality of three being most preferred. Thus, most preferred alkanolamine starters are those having the general structural formula $H_{3-x}N-((R-O)_mH)_x$ wherein R is a lower aliphatic 1,2-alkylene radical having from two to six carbon atoms, $x$ is a positive integer having a value of two or three and $m$ is a positive integer having a value of one or two, and H is an active hydrogen capable of effecting the cleavage of epoxide and anhydride rings. Examples of useful tertiary alkanolamines ($x=3$) are triethanolamine, tripropanolamine and triisopropanolamine and the oxyethylene and oxypropylene derivatives thereof. Examples of useful secondary alkanolamines ($x=2$) are diethanolamine, dipropanolamine, and diisopropanolamine and the oxyalkylene derivatives thereof. Preferred alkanolamines and oxyalkylenealkanolamines are those having from four to about 18 carbon atoms. Mixtures of alkanolamines may be employed. Especially useful are mixtures of a dialkanolamine and a trialkanolamine, and of a trialkanolamine with a tetrakis- or pentakisalkanolamine. By varying the ratio of dialkanolamine to trialkanolamine it is generally possible to achieve a better balance of viscosity of the polyol and the inherent flame retardancy, and physical properties of the polyurethane than can be obtained using either alkanolamine alone.

Mixtures of alkanolamines and oxyalkylenealkanolamines are also quite useful. In fact, one of the preferred operating embodiments of the present invention contemplates the preparation of the alkanolamine reactant in situ by the known reaction of anhydrous ammonia and saturated aliphatic monoepoxides, such as ethylene oxide or propylene oxide. This reaction generally results in a mixture of alkanolamines and some oxyalkylenealkanolamines and this mixture may be employed directly in further reaction with the other components of the process of this invention as described above. In preparing the alkanolamine reactant in this manner, process conditions known to the art are utilized, and the mol ratio of monoepoxide to anhydrous ammonia is chosen so that no ammonia is left over at the end of the reaction. The mol ratio of monoepoxide to ammonia employed should be at least about 2.5, and preferably at least three, in order to avoid the formation of any undesirably large amounts of monoalkanolamine derivatives. Reagents known to the art which alter the ratios of mono-, di-, and trialkanol derivatives formed such as carbon dioxide may advantageously be used in the preparation of the alkanolamine reactant.

The alkanolamines and oxyalkylenealkanolamines employed should advisably be dry, that is, contain little or no water. Suitable alkanolamines will contain less than about one percent by weight, and preferably less than 0.5 percent by weight of water. In order to realize the benefits of the present invention it is further advisable that the di- and tri-alkanolamines or oxyalkylenealkanolamines employed contain less than about ten percent and preferably less than about five percent by weight of monoalkanolamines of the structure $H_2N-R-OH$ or ether derivatives thereof.

In another embodiment of the present invention it has been found that mixtures of the above-described alkanolamines with polyhydric alcohols are also useful as starters. Preferred for use in such admixtures are polyhydric alcohols having from three to six carbon atoms and from three to six hydroxyl groups. Quite unexpectedly and surprisingly, suitable starter mixtures of alkanolamines with polyhydric alcohols result in polyurethane polyols having a lower viscosity in combination with a higher content of cyclic hydrocarbon radicals, —RING—, than can be obtained with either starter component alone, and such polyols derived from these mixed starters yield polyurethanes which exhibit a higher degree of flame retardancy and better physical properties. Examples of polyhydric alcohols useful in admixture with alkanolamines are glycerol, sorbitol, erythritol, trimethylolethane, trimethylolpropane, trimethylolbutane, pentaerythritol and 1,2,6-hexanetriol. Polyhydric alcohols which are especially preferred in such admixtures are glycerol, trimethylolethane, trimethylolpropane and a commercially available mixture consisting of various straight-chain polyalcohols having from three to six carbon atoms and a hydroxyl equivalent weight of about 31 to 32. The amount of alkanolamine in such a starter mixture will generally be at least ten percent, and preferably be at least twenty percent by weight of the weight of the starter mixture, although as little as one to five percent by weight will frequently be sufficient to result in a polyol different from that derived from the use of the aliphatic polyalcohol alone.

Especially useful are starter mixtures of a dialkanolamine with a trifunctional polyalcohol, and of a trialkanolamine with a polyalcohol having a functionality ranging from three to about six. Specific examples of very desirable starter mixtures are exemplified by admixtures of diethanolamine, diisopropanolamine, triethanolamine, or triisopropanolamine, with trimethylolethane, trimethylolpropane, or glycerol, and by admixtures of triethanolamine or triisopropanol amine with pentaerythritol, erythritol, sorbitol, or mannitol.

The most preferred starters for use in this invention are mixtures of a dialkanolamine with either a trialkanolamine or with an aliphatic trifunctional polyalcohol. The use of the dialkanol amine, alone or in large proportion results in a polyurethane polyol with a very high anhydride residue content. Because of the solubility characteristics of the dialkanolamine, however, the use of admixtures of dialkanolamines with trialkanolamines or with aliphatic triols is desirable in order to obtain a homogenous reaction mixture. Such preferred starter mixtures result in polyurethane polyols having a very high halogen content and desirably low viscosities. The very high anhydride residue content in the polyols made from these mixtures leads to exceptionally good flame retardancy and dimensional stability in the polyurethane foams made from such polyols. When tetrabromophthalic anhydride is employed, the halogen content of the resulting polyol will generally range from about forty to about fifty percent by weight of bromine, when chlorinated anhydrides are employed halogen contents ranging from about thirty to about forty percent by weight are obtained, with the largest chlorine contents being obtained with the use of Chlorendic anhydride The viscosities of polyols prepared from these preferred starter mixtures are generally lower than would be expected in view of the high anhydride residue content and equivalent weight of these polyols. Thus, polyoyls from these preferred starter mixtures possess viscosities ranging from about 10,000 centipoises to about one million centipoises at 25° C., and more frequently from about 50,000 centipoises to about 500,000 centipoises at 25° C.

To prepare the polyol components of the polyurethanes of the present invention the cyclic monoether, the cyclic monoanhydride and the polymerization starter are reacted together in intimate admixture. The reaction is conducted within a temperature range of usually at least about 50° C. and generally not more than 200° C. and frequently within an range of about 100° C. to 150° C. Although the reaction may be carried out at atmospheric pressure, it is generally more convenient to conduct the polymerization in a closed system at superatmospheric pressure, such as autogenous pressure. Suitable superatmospheric pressures will generally range from about 30 pounds per square inch to about 500 pounds per square inch, and will frequently not exceed 200 pounds per square inch. The reaction can be effected batch-wise, in a closed vessel, such as an autoclave equipped with agitation, or under continuous conditions in a tubular reactor at elevated temperatures and pressures.

To produce the novel polyols of this invention the cyclic ether preferably must be present in substantial concentration in the homogeneous liquid reaction phase during the reaction period in which the copolymerization occurs. Otherwise stated, the process should be carried out in a manner such that a substantial amount of the cyclic ether is present in the homogeneous liquid solution phase containing the anhydride and the polymerization starter while at least 50 percent, and advisably while 75 percent, of the ring-opening polymerization reaction is effected. Furthermore, an average of at least 0.3 equivalents of cyclic ether are advisably present in solution with the sum of equivalents of acid groups plus one-half the equivalents of anhydride present while a major amount of the reaction occurs. A maximum of six equivalents of cyclic ether in this same ratio is generally used. A minimum of 1.0, and preferably 1.25 equivalents of cyclic ether in said ratio gives polymers of particularly desirable properties. For purposes of this invention one equivalent of cyclic ether is taken to be one mol of cyclic ether, and one equivalent of acid or anhydride is taken to be equal to that amount which is required to neutralize one mol of sodium hydroxide, e.g. one equivalent of an acid group is equal to one carboxylic acid gram mol divided by the number of carboxylic acid groups per mol, and one mol of anhydride equals two equivalents, so that one-half the number of equivalents of anhydride present generally equals the number of mols present. While it is frequently convenient to combine all the reactants initially before heating the reaction mixture, it is to be understood that the entire amount of cyclic ether or all of the anhydride does not have to be present at the start of the reaction, but that these reactants may be suitably added in several portions during the course of the copolymerization reaction. In order to effect the homopolymerization of the cyclic ether to polyether segments it is desirable, however, that the cyclic ether is not added in a large number of very small increments which would result in a very low concentration of cyclic ether while the reaction proceeds. Thus, the cyclic ether should not be added dropwise as the reaction proceeds because this mode of operation results in a minute instantaneous concentration of cyclic ether, and produces essentially a pure polyester.

The reaction is conveniently effected by combining all three reactants and heating them together at elevated temperature and pressure for a length of time sufficient to complete the reaction. The polymerization is generally completed within about one to five hours, with the exact time depending on the nature of the reactants and the reaction conditions employed. While it is frequently most convenient to complete the reaction as fast as possible, it is sometimes desirable to conduct the reaction at a lower temperature so as to minimize undesirable side reactions, and to thus extend the required reaction time.

To prepare the polyols of the present invention the monoepoxide is employed in excess over the stoichiometric amount needed to react with the anhydride. To prepare suitable polyols a mol ratio of monoepoxide to cyclic monoanhydride of at least about 1.4 should be employed. The mol ratio of monoepoxide residues, that is, 1,2-oxyalkylene radicals, to cyclic monoanhydride residues chemically combined will range from about 1.4 to about 2.5, and frequently will be about 1.5–2.0.

The amount of alkanolamine starter or alkanolamine-polyalcohol starter mixture will generally range from about 10 percent, and more frequently from about 15 percent to generally not more than 70 percent, and more frequently not more than 45 percent by weight based on the weight of the total reactant mixture. The amount of dialkanolamine in a dialkanolamine-trialkanolamine starter mixture will suitably vary from about 5 to 75 percent, and more preferably from about 10 to 50 percent by weight of the weight of such a starter mixture. Starter mixtures composed of alkanolamines and aliphatic polyalcohols will consist of at least one, and preferably at least five percent by weight of alkanolamine.

The polyurethane polyols employed in the present invention are viscous fluids readily soluble in many organic solvents. The equivalent weight of these polymers, that is the molecular weight per reactive hydroxyl group, is essentially equal to the equivalent weight of the starter (that is, the molecular weight per reactive starter hydrogen), multiplied by the total weight of the combined reactants and divided by the weight of the starter employed.

The polyols are believed to result from a random ring-opening addition reaction initiated by the active hydrogens of the alkanolamine, or polyalcohol-alkanolamine mixture, which acts as the starter, with the polymer chains growing by stepwise addition through ring opening of the epoxide ring and the cyclic anhydride ring. Each active hydrogen is potentially capable of starting one such polymer chain.

The novel process of the present invention is particularly valuable for the preparation of polyols containing tetrachloro-1,2-phenylene radicals, tetrabromo-1,2-phenylene radicals, and hexachlorobicycloheptylene radicals. Known polyester polyols incorporating such radicals are extremely viscous and are very difficult to prepare by methods known to the art.

The preferred polyurethane polyols of the present invention may be represented by the general structural formula N(POLYMER CHAIN—R—OH)$_3$ and by admixtures thereof with a polyol of the general structural formula Z(POLYMER CHAIN—R—OH)$_f$, wherein N is a nitrogen atom, R is a saturated lower aliphatic 1,2-alkylene radical of from two to six carbon atoms or a 1,3-alkylene radical of from two to ten carbon atoms, OH is a hydroxyl radical, Z is a hydrocarbon residue attached to the hydroxyl radicals of a saturated aliphatic polyalcohol having at least three carbon atoms and at least three hydroxyl radicals, $f$ is an integer having a value of at least three, and POLYMER CHAIN is a polymer chain composed of an essentially random arrangement of (X) saturated lower aliphatic radicals of the general formula —R—O—, wherein R has the above-assigned meaning and O is an oxygen atom, and (Y) cyclic monoanhydride residues of the general formula

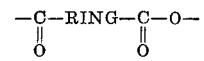

wherein —RING— is a cyclic hydrocarbon radical having from six to twelve carbon atoms and from zero to six halogen substituents selected from the group consisting of chloro and bromo radicals, with the mol ratio of said (X) units to said (Y) units varying from about 1.5 and preferably 2.0 to about ten, and with at least two of said polymer chains being attached to said nitrogen atom through the carbon atoms of said —R—O— radicals.

Suitable polyols of interest, if derived solely from alkanol amine starters, will have a nitrogen content ranging from at least 2.5 percent to about five percent of the total weight of the polyol. Polyols derived from alkanolamine-aliphatic polyalcohol starter mixtures will have a nitrogen content ranging from at least about 0.1 percent by weight to about 4 percent by weight of the total weight of the polyol. The weight content of the anhydride residues for the polyols of the present invention will range from at least 20 percent, and advisably at least 25 percent and preferably at least about 30 percent to generally not more than 75 percent, and advisably not more than 70 percent by weight based on the total polyol weight, with the remainder being composed of 1,3-oxyalkylene monoepoxide residues and aliphatic polyalcohol residues. When the anhydride residues are derived from relatively low-molecular-weight dicarboxylic acids, such as phthalic acid, the weight percentage will tend to range from about 20 percent to about 50 percent whereas the amount of anhydride residues derived from the higher molecular weight halogenated dicarboxylic acids will vary from about 35 percent to about 75 percent by weight based on the total polyol weight.

Despite the substantial proportion of cyclic hydrocarbon radicals incorporated into the polymer chains the bulky viscosity at room temperature of these polyols remains desirably low, ranging from at most about 500,-000–1,000,000 centipoises and more frequently from about 200,000 centipoises to about 1000 centipoises at 25° C. By comparison, a trifunctional polyol prepared from glycerol, phthalic anhydride, and 2 - ethyl - 1,3-hexanediol, which contains a comparable weight percentage of cyclic 1,2-phenylene hydrocarbon radicals has a viscosity far in excess of 1,000,000 centipoises.

The novel polyurethanes of the present invention are prepared by coreacting (1) an aromatic organic polyisocyanate having at least two isocyanato groups, that is two —NCO groups, with (2) the polyols described herein above. The polyurethanes of the present invention may be prepared in the form of hard, tough coatings; rigid, tough castings; and, particularly, rigid, tough, non-elastic foams which have slow recovery properties. By employing such reactants as tetrachlorophthalic anhydride, tetrabromophthalic anhydride, Chlorendic anhydride or epichlorohydrin in the preparation of the polyols, highly flame-retardant polyurethane compositions can be prepared without the use of special additives. The polyurethane compositions are prepared from polyols having equivalent weights ranging from about 100 to about 200, and occasionally to about 250. The equivalent weights of polyols based on phthalic anhydride will usually range from about 100 to somewhat more than 150, and polyols derived from halogenated anhydrides such as tetrachlorophthalic anhydride or tetrabromophthalic anhydride will frequently have equivalent weight falling within the upper portion of the equivalent weight range. In comparison to prior art compositions, the instant polyurethanes are less expensive, possess better hydrolytic stability, exhibit less shrinkage when subjected to low temperatures and show better humid aging behaviour. To prepare useful polyurethanes the instant polyols may be used solely or they may be employed as blends, in admixture with other polyols, such as those described in our copending applications, or with commercially available polyols, such as polyethers of sorbitol, methyl glucoside, pentaerythritol, or sucrose. The instant polyols are especially useful in urethane formulations containing one or more other polyols. When used in this manner, the instant polyols impart desirably low viscosity to the polyol blends and flame retardancy to the final product.

The polyurethane compositions are prepared from the polyols described herein and organic polyisocyanates by mixing and reacting these materials in accordance with the standard techniques known to the art. For example, references which disclose the preparation of polyurethane foams, and the suitable materials for such preparation are U.S. Pats. 2,779,689; 2,785,739; 2,787,601; 2,788,-335; 3,079,350; and the bulletin "Rigid Urethane Foams, II, Chemistry and Formulation" by C. M. Barringer, HR–26, Elastomer Chemicals Department, E. I. du Pont Co., April 1958, and the books by J. H. Saunders and K. C. Frisch, "Polyurethanes, Chemistry and Technology," Interscience, New York, N.Y., 1962 and 1964.

Polyurethane compositions are suitably prepared by mixing and reacting the polyols with a functionality of at least three with a polyisocyanate having at least two isocyanato groups. In general, somewhat better physical properties result when isocyanates having a functionality of more than two are used. The polyisocyanates employed in the preparation of the polyurethane compositions can be such compounds as 2,4 - tolylene diisocyanate, 2,6-tolylene diisocyanate, crude tolylene diisocyanates, 1,4-phenylene diisocyanate, 1,3-phenylene diisocyanate, 1,5-naphthalene diisocyanate, 4,4'-diphenylene diisocyanate, 3,3'-dimethyl-4,4'-diphenylene diisocyanate, 4,4' - diisocyanato diphenylmethane, and 4,4',4" - triisocyanato triphenylmethane. Other useful polyisocyanates are polymethylene polyphenylisocyanates produced by phosgenation of multifunction condensation products of aniline and formaldehyde. One such product is PAPI which is a dark somewhat viscous liquid aromatic polyisocyanate containing both ortho and para substitution according to the formula:

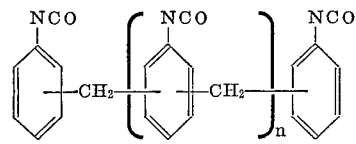

where $n$ has an average value of about 1. The molecular weight is about 384 and the average number of isocyanato groups per molecule is 3.03. A similar product is known in the trade as Mondur MR. Also very useful are aromatic polyisocyanates containing halogen. Examples of such materials are chloro- and bromo-derivatives of phenylene diisocyanate and tolylene diisocyanate. Polyisocyanates made by reacting trimethylolpropane or similar polyols with tolylene diisocyanates may also be used. Aromatic diisocyanates are especially useful. Mixtures of polyisocyanates may advantageously be used.

The polyurethanes are produced by the reaction of the instant polyol with the organic polyisocyanate under conditions generally used to form polyurethanes. Depending on the particular polyurethane formulation, the polyol-polyisocyanate reactant mixture will also desirably contain other conventional ingredients, such as one or more catalysts, surfactants, blowing agents, pigments, stabilizing agents or other additives. Such other components are employed in the standard amounts generally used in the preparation of polyurethanes, with the exception that less catalyst may be required for the polyurethanes of this invention since the polyols described herein tend to be more reactive than conventional polyethers.

Any of the conventional catalysts employed in polyurethane technology can be used as warranted. Some examples of useful catalysts which can be employed are tertiary amines, such as tetramethyl-1,3-butane diamine, triethylene diamine, triethanolamine, N-methylmorpholine, N-ethylmorpholine, tribenzylamine, N,N-dimethylbenzylamine, as well as tin compounds, such as dibutyl tin dilaurate, stannous oleate, stannous octoate, and others.

Conventional blowing agents, which vaporize at or below the temperature of the foaming mass, such as halohydrocarbons exemplified by fluorotrichloromethane (hereinafter referred to as Freon-11), stabilized fluorotrichloromethane (hereinafter referred to as Freon-11B) and dichlorodifluoromethane are used in preparing the rigid foams. Other known blowing agents, such as butane and methylene chloride, may also be employed.

Any of the various types of surfactants known to be useful in the preparation of cellular polyurethanes may be employed in the process of preparing polyurethane foams according to this invention. Examples of suitable surfactants are castor oil sulfonate, ethylene oxide adducts of sorbitol mono-esters of long-chain fatty acids, ethylene oxide adducts of alkyl phenols, polydimethylsiloxanes, and especially ethylene oxide adducts of polydimethylsiloxanes. These latter compounds, and similar block copolymers of polyglycols and dimethylsiloxane are especially useful for this purpose. U.S. Pat. 2,834,748 describes such especially suitable water-soluble organo-silicone copolymers for use as emulsifying agents. Examples of useful commercially available organo-silicones are DC–113, X–520, and Silicone Fluid 199.

In the preparation of rigid polyurethane foams it is possible to use the so-called "one-shot" method in which all ingredients of the formulation are combined in one step, or one may employ the prepolymer technique whereby the polyisocyanate is partially prereacted with the polyol. In addition to obviously being useable in prepolymer and semi-prepolymer-type systems, the instant polyols are particularly well suited for one-shot foaming because of their specific combination of relatively high equivalent weight, low viscosity, and good reactivity.

Because of the special qualities inherent in the novel polyols of this invention polyurethane formulations are obtained which are nonresilient and tough and which give rigid foams, hard coatings and rigid solid castings. In general, satisfactory amounts of polyisocyanate will range from about 60 percent, and preferably not more than about 50 percent, to not less than about 25 percent by weight of the combined weight of the polyol-polyisocyanate reactants.

The dimensional stability of humid aging at 158° F. (70° C.) and 100% relative humidity of the polyurethanes of the present invention compare very favorably with those of the rigid polyurethane foams in present commercial use. Many of the foams of the present invention have volume increases of less than 30 percent and frequently less than 20 percent when a 2.0 pound-per-cubic-foot foam is aged for twenty days at 70° C. and 95% relative humidity. Similarly low volume changes are found at foam densities of about 1.7 pounds per cubic foot or even less. It is particularly unexpected that polyurethane foams prepared from polyols having equivalent weights ranging as high as about 225 show volume changes of less than 20% on aging for 20 days or longer at 70° C. and 95% relative humidity.

The polyurethane foams of this invention are quite generally self-extinguishing, and frequently non-burning when tested according to the ASTM–1692 test procedure. The foams having such a degree of flame retardancy will normally contain at least 5 to 10 percent by weight of halogen bound in the polymer network. Those foams having higher halogen contents, especially of bromine, in the vicinity of 10 percent of bound bromine have especially good flame retardancy, and form a heavy, dense char when burned.

The use of the instant polyols is also very useful in the preparation of polyurethane castings. In the preparation of polyurethane castings it is necessary that the polyols have an extra low acid number such as 2 or less (5 is considered a maximum high) and a water content of 0.02% or less. To prepare such polyols having the required low acid number and water content by conventional techniques is particularly troublesome, difficult, and expensive. However, polyols having the necessary extra low acid number and water content can be formed directly by the novel process described herein, since water is not formed in this process. The present polyols allow the preparation of such castings in a novel one-step process, in contrast to the conventional multi-step method in use at present. In addition, polyurethane castings based on these novel polyols can be prepared with a lower polyisocyanate content and do not require any curing agent.

In the formation of polyurethane castings the polyol and polyisocyanate are combined and, without a catalyst, can be cured at about 70 to 150° C. to a solid product. The increased reactivity of the instant polyols which appears to stem from their tertiary nitrogen content is particularly advantageous in this application. When a catalyst such as a tertiary amine or a tin compound is used, curing can be achieved at room temperature.

The polyurethane compositions of the instant invention also serve as tough, hard adherent coatings in a number of applications. Preferred in this application are polyols derived from dialkanol amines. Specifically, these polyurethanes form excellent protective coatings for wood surfaces subjected to abrasion and impact, such as floors, furniture, and bowling alleys. They also form excellent protective coatings for metal substrates subjected to bending, abrasion, or chemical attack. The polyurethane coating compositions can be applied to such surfaces by any of the conventional fluid coating techniques such as, for examples, spray, dip, brush, knife and roller coating. The compositions may be diluted with solvents such as lactones, ketones, esters, ethers, and others, and pigments and other additives may be added, if desired. In general, the solvent-diluted compositions are coated onto the substrate, then dried and cured at room temperature or elevated temperature. The cured coating compositions are hard, flexible, abrasion-resistant and chemically inert and exhibit excellent adhesion.

The following examples are presented to illustrate, but not to limit, the invention:

EXAMPLE I 103.8 g. of triethanolamine, 123.3 g. of phthalic anhydride, and 145.5 g. of propylene oxide are combined in a 1-liter 316 stainless steel reactor, and the reactor is closed and sealed. The reactant mixture is heated, with stirrings, to 275° F. and held at this temperature for 1 hour and 10 minutes. The maximum pressure reached is 102 p.s.i.g. The vessel is then vented and the product recovered.

The recovered product weighs 306 g., is orange colored, has a somewhat unpleasant odor, and has a viscosity of 11,000 centipoises at 25° C. The amount of combined propylene oxide is 79 grams, and the calculated equivalent weight is 149.

The above polyol, 36.3 g., was thoroughly mixed with 0.6 g. of a 20% solution of triethylene diamine in dimethylethanolamine, 0.9 g. of a block copolymer of dimethylsilicone and polyethylene oxide, and 14.1 g. of fluorotrichloromethane. Then, 35.9 g. of polyphenylene polyisocyanate was stirred in. The resulting mixture quickly foamed, having a final tack-free and rise time of 115 seconds. The resulting foam had a density of 1.9 pounds per cubic foot, and burned slowly with a smoky flame when ignited.

This example was repeated substituting 150 g. of 1,2-butylene oxide for the propylene oxide. The results were very similar, except that the recovered polyol weighed about 325 grams.

EXAMPLE II 116.3 g. of technical-grade triisopropanolamine, 100.0 g. of phthalic anhydride, and 99.7 g. of propylene oxide were added to a 1-liter, 316 stainless steel pressure vessel, and the vessel was closed and sealed. The reactant mixture was heated with stirring to 260° F. and held at that temperature for 1 hour and 15 minutes. The maximum pressure reached was 66 p.s.i.g. The vessel was then vented and the product isolated.

The product was red-brown in color, had a mild odor, and weighed 272 g., indicating that 56 grams of propylene oxide had become combined. The viscosity is about 20,000 centipoises at 25° C. and the calculated equivalent weight is 149.

101.5 g. of above polyol was mixed with 25.5 g. of fluorotrichloromethane, 2.9 g. of a copolymer of dimethyl silicone and polyethylene glycol (L–520) and 98.7 g. of polyphenylene polyisocyanate. The mixture had not creamed in 4 minutes. Then 0.9 g. of tetramethyl-1,3-butane diamine was stirred in, and the mixture foamed very quickly to a fine-celled foam having a density of about 2 pounds per cubic foot. A slight amount of shrinkage was observed on standing.

The above preparation of the polyol was repeated substituting 200 g. of tetrachlorophthalic anhydride for the phthalic anhydride, and using 150 g. of propylene oxide. The results were similar, except that the product was considerably more viscous and weighed about 375 g.

Another polyol was prepared as described above using 275 g. of Chlorendic anhydride as the anhydride, and 150 g. of propylene oxide. This product is quite viscous and weighed about 450 g.

EXAMPLE III

A mixture of 98.5 g. of diisopropanolamine, 113.0 g. of phthalic anhydride, and 160.5 g. of propylene oxide was combined in a 1-liter, 316 stainless steel pressure vessel and the vessel was closed and sealed. The mixture was heated to 270° F., with stirring, and held at this temperature for 1 hour and 30 minutes. The maximum pressure attained was 87 p.s.i.g. The pressure was then vented and the product recovered.

The product is yellow in color, and has a mild odor. The product weighed 286 g., indicating that 74 g. of propylene oxide had become combined. The viscosity is about 60,000 centipoises at 25° C., and the calculated equivalent weight is 128.

To 101.6 g. of this polyol in a 1-gallon carton was added 32.0 g. of fluorotrichloromethane, 2.8 g. of a silicone-glycol copolymer surfactant, 3.0 g. of tetramethyl-1,3-butanediamine, and 119.1 g. of polyphenylenepolyisocyanate. The mixture foamed quickly to a rigid polyurethane foam having a density of about 2 pounds per cubic foot, which foam did not shrink on standing. On exposure to 95% relative humidity and 70° C. for 28 days, the foam showed a volume increase of about 15%.

EXAMPLE IV

This example illustrates the use of monoisopropanolamine as a starter.

102.7 g. of monoisopropanolamine, 200.4 g. of phthalic anhydride, and 245.7 g. of propylene oxide were added to a 1-liter 316 stainless steel pressure vessel, and the vessel is closed and sealed. The mixture was then heated to 275° F., with stirring, and held at this temperature for 1 hour and 40 minutes. The maximum pressure was 86 p.s.i.g. The vessel was then vented and the product recovered.

The product is very pale in color, weighed 426 g., and had a viscosity of less than 1000 centipoises at 25° C., and crystallized on standing at 55° F.

EXAMPLE V

This example illustrates the preparation of a mixed diisopropanolamine-triisopropanolamine starter in situ, using ammonia and propylene oxide.

Ammonia, 35 g., and propylene oxide, 500 g., were slowly pumped under pressure into a 1-liter 316 stainless steel pressure vessel equipped with cooling coils. The temperature was raised to 150° C., the initial exotherm being controlled with the use of the cooling coils. Then the temperature was maintained at 150° C. for a length of time sufficient for the pressure to drop substantially, and become nearly constant.

The product is viscous, and weighed 320 g. It has a calculated equivalent weight of 52. 104 g. of the above product, 151.2 g. of phthalic anhydride, and 123.6 g. of propylene oxide were placed in a 1-liter 316 stainless steel pressure vessel. The vessel was then closed and sealed. The mixture was then heated to 270° F., with stirring and held at this temperature for 1 hour and 45 minutes. The vessel was then vented. The product weighed about 355 g., has a viscosity of about 40,000 centipoises at 25° C., and a calculated equivalent weight of 172.

The above polyol, 25.4 g., was thoroughly mixed with 22.3 g. of the propoxylated Mannich condensate of one mol of phenol, one mol of formaldehyde, and one mol of diethanolamine, (having an equivalent weight of 105), 0.8 g. of tetramethyl-1,3-butanediamine, 1.0 g. of a block copolymer of dimethylsilicone and polyethylene oxide, and 15.9 g. of fluorotrichloromethane. Then 51.8 g. of polyphenylene polyisocyanate was mixed in. The mixture quickly foamed, and had a rise time of 2 minutes. The foam had a density of 2.0 pounds per cubic foot and was slowly self-extinguishing when ignited.

EXAMPLE VI

Into a 1-liter, 316 stainless-steel pressure vessel equipped with heater and stirrer was placed 37.8 grams of pentakis (hydroxy propyl) diethylene triamine, 45.3 grams of triethanolamine, 121.5 grams of tetrachlorophthalic anhydride and 95 grams of propylene oxide. The vessel was sealed and the reaction mixture was heated to 90° C., and held at that temperature for 35 minutes. Then the temperature was raised to 110° C. and held at that temperature for 35 minutes. Finally the excess epoxide was vented and the product recovered. The product was amber in color, weighed 254 grams, had a chlorine content of 24% by weight, and a theoretical equivalent weight of 184. The viscosity was 172,000 centipoises at 35° C.

The above polyol, 17.6 grams, was mixed with 32.8 grams of a hydroxypropylated Mannich condensation product (equivalent weight of 105) of one mol of phenol, one mol of formaldehyde, and one mol of diethanolamine, 0.8 grams of a 20% solution of triethylene diamine in dimethylethanolamine, 1.2 grams of a block copolymer of dimethylsilicone and polyethylene oxide (DC–193), and 15.6 grams of fluorotrichloromethane. Then 59.8 grams of polyphenylenepolyisocyanate was mixed in. The cream time was 20 seconds and the rise and tack-free time was 60 seconds. The foam had a density of 2.33 pounds per cubic foot. This foam was self-extinguishing when tested according to the ASTM–1692 procedure and required about 15 seconds for extinguishment of the flame. The total length burned was 1.5". When aged at 70° C. for 1 week in a closed oven saturated with water vapor, the volume increase was 3.1%.

This polyol preparation was repeated, using 34.1 grams of tetrakis (hydroxypropyl) ethylene diamine in place of the hydroxy-propylated triamine. The results were similar, except that the viscosity of the polyol was about 20% lower.

EXAMPLE VII

Into a 1-liter 316 stainless steel pressure vessel equipped with heater and stirrer was placed 40.7 grams of diethanolamine, 61.5 grams of 99.5% glycerol, 432.4 grams of tetrabromophthalic anhydride, and 249 grams of propylene oxide. The vessel was sealed, and then heated to 95° C. The vessel was held at about 100° C. for 40 minutes, and then at 110° C. for an additional 60 minutes. The vessel was then vented, and the product recovered. The product was pale olive in color, weighed 630 grams, had a bromine content of 47.5%, a theoretical equivalent weight of 199, and a viscosity of about 500,00 centipoises at 35° C.

27.1 grams of the above polyol was mixed with 21.8 grams of hydroxypropylated pentaerythritol (equivalent weight 100), 0.7 gram of the 20% solution of triethylene diamine in dimethylethanolamine, 1.4 grams of a block copolymer of dimethyl silicone and polyethylene oxide (L–5340), and 16.3 grams of fluorotrichloromethane. Then 52.0 grams of polyphenylene polyisocyanate were stirred in. The mixture creamed in 20 seconds, and had a rise and tack-free time of 120 seconds. When subjected to the ASTM–1692 test procedure, this foam was just non-burning, and required 8 seconds for flame extinguishment. The foam density was 2.03 pounds per cubic foot. When humid aged for 1 week at 70° C. in a closed oven saturated with water vapor, the volume increase was 3.2%.

EXAMPLE VIII

In a 1-liter 316 stainless steel pressure vessel equipped with heater and agitator was placed 25.0 grams of diethanolamine, 56.8 grams of triethanolamine, 210.2 grams of tetrabromophthalic anhydride, and 130 grams of propylene oxide. The vessel was sealed and heated to 80° C. for a period of 20 minutes, 95° C. for 32 minutes, and 110° C. for 50 minutes. Then the vessel was vented and the product recovered. The product was amber in color, weighed 365 grams, had an equivalent weight of 196 and a bromine content of 40% by weight. The viscosity was 105,000 centipoises at 30° C.

23.5 grams of the above polyol was mixed with 17.8 grams of hydroxypropylated pentaerythritol (equivalent weight 100), 0.75 gram of the 20% solution of triethylenediamine in dimethylethanolamine, 1.15 grams of a block copolymer of dimethylsilicone and polyethylene oxide, and 12.2 grams of fluorotrichloromethane. Then 44.0 grams of polyphenylenepolyisocyanate was mixed in. The cream time was 15 seconds, the tack-free time was 60–65 seconds, and the rise time was 85 seconds. This foam was non-burning when tested by the ASTM 1692 procedure and required 5 seconds for flame extinguishment. The foam density was 1.97 pounds per cubic foot. When humid aged for 1 week at 70° C. in a closed oven saturated with water vapor, the volume increase was 3.3%.

EXAMPLE IX

This example illustrates the combination of unexpectedly high halogen content and low viscosity of a polyol prepared using a mixture of glycerol and triethanolamine as the starter, compared to the polyols prepared using each starter individually.

(A) Into a 1-liter, 316 stainless steel pressure vessel equipped with a heater and stirrer was placed 27.2 grams of triethanolamine, 69.6 grams of 99.5% glycerol, 405.7 grams of tetrabromophthalic anhydride, and 200 grams of propylene oxide. The vessel was sealed and the reaction mixture was heated to 85° C. and held at this temperature for 2½ hours. Then the excess propylene oxide was vented and the product recovered. The product was pale in color, weighed 600 grams, and had a viscosity of 60,000 centipoises at 28° C. The theoretical equivalent weight is 211, and the bromine content is 46.6% by weight.

(B) Using the same equipment and procedure, 74.2 grams of triethanolamine, 232.3 grams of tetrabromophthalic anhydride, and 178 grams of propylene oxide were reacted. The resulting product weighed 363 grams, was pale olive in color, and had a viscosity about 2 to 3 times that of the above polyol. The theoretical equivalent weight is 243, and the bromine content is 44.0% by weight.

(C) For purposes of comparison a similar polyol was prepared by reacting 80 grams of glycerol, 300 grams of tetrabromophthalic anhydride, and 180 grams of propylene oxide at 90° C. for 3 hours using the same equipment and procedure as in Part A. The polymeric product weighed 545 grams, and had a viscosity of 350,000 centipoises at 14° C. The theoretical equivalent weight is 207 and the bromine content is 38% by weight.

25.4 grams of this brominated triol was mixed with 18.4 grams of hydroxypropylated pentaerythritol, 0.9 gram of the 20% solution of triethylene diamine in dimethylethanolamine, 1.5 grams of a block copolymer of dimethylsilicone and polyethylene oxide, and 13.5 grams of fluorotrichloromethane. Then 45.5 grams of polyphenylene polyisocyanate was stirred in. The cream time was 18 seconds, the tack-free time was 115 seconds, and the rise time 135 seconds. This foam was self-extinguishing when tested by the ASTM–1692 procedure, required about 10 seconds for flame extinguishment, and had a total burned length of 1½". The foam density was 2.08 pounds per cubic foot. When aged for 1 week at 70° C. in a closed oven containing 3 open pans of water, the volume increase was 6.7%.

The polyol prepared in Part A, from a mixed starter, has an equivalent weight about that which would be obtained by mixing polyols prepared in Parts B and C. However, the viscosity of the polyol of Part A is much less than that of polyols resulting from Parts B and C, and the bromine content is substantially higher in Part A than in either Part B or Part C.

We claim:

1. A polyurethane composition comprising the reaction product of (A) an organic polyisocyanate having at least two isocyanato groups with (B) a polyester-ether polyol having a functionality of at least three and being the reaction product of (1) a cyclic monoether selected from the group consisting of saturated lower aliphatic monoepoxides and monooxetanes, (2) a cyclic monoanhydride of an organic dicarboxylic acid selected from the group consisting of aromatic and cycloaliphatic dicarboxylic acids having at least eight carbon atoms and having both carboxylic acid groups attached directly to cyclic hydrocarbon radicals, and (3) from about 10 percent to about 70 percent by weight based on the weight of the total reactant mixture of a polymerization starter having at least three active hydrogen atoms and being selected from the group consisting of alkanolamines having from one to four nitrogen atoms and from three to six active hydrogen atoms, hydroxyalkylene ethers of said alkanolamines, and admixtures of said alkanolamines with saturated aliphatic polyalcohols having from three to six carbon atoms and three to six hydroxyl radicals, with the said alkanolamine comprising at least about 1 percent by weight of the said admixture.

2. The polyurethane composition of claim 1 wherein said monoether is selected from the group consisting of ethylene oxide, propylene oxide, and 1,2-butylene oxide, said cyclic monoanhydride is phthalic anhydride and said polymerization starter is selected from the group consisting of dialkanolamines and trialkanolamines.

3. The polyurethane composition of claim 1 wherein said monoether is selected from the group consisting of ethylene oxide, propylene oxide, and 1,2-butylene oxide, said cyclic monoanhydride is tetrachlorophthalic anhydride and said polymerization starter is selected from the group consisting of dialkanolamines and trialkanolamines.

4. The polyurethane composition of claim 1 wherein said monoether is selected from the group consisting of ethylene oxide, propylene oxide, and 1,2-butylene oxide, said cyclic monoanhydride is tetrabromophthalic anhydride and said polymerization starter is selected from the group consisting of dialkanolamines and trialkanolamines.

5. The polyurethane composition of claim 1 wherein said monoether is selected from the group consisting of ethylene oxide, propylene oxide, and 1,2-butylene oxide, said cyclic monoanhydride is 1,4,5,6,7,7-hexachlorobicyclo-(2,2,1)-5-heptene-2,3-dicarboxylic acid anhydride and said polymerization starter is selected from the group consisting of dialkanolamines and trialkanolamines.

6. The polyurethane composition of claim 1 wherein said monoether is selected from the group consisting of ethylene oxide, propylene oxide, and 1,2-butylene oxide (and epichlorohydrin), said cyclic monoanhydride is phthalic anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

7. The polyurethane composition of claim 1 wherein said monoether is selected from the group consisting of ethylene oxide, propylene oxide, and 1,2-butylene oxide (and epichlorohydrin), said cyclic monoanhydride is tetrachlorophthalic anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

8. The polyurethane composition of claim 1 wherein said monoether is selected from the group consisting of ethylene oxide, propylene oxide, and 1,2-butylene oxide (and epichlorohydrin), said cyclic monoanhydride is tetrabromophthalic anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

9. The polyurethane composition of claim 1 wherein said monoether is selected from the group consisting of ethylene oxide, propylene oxide, and 1,2-butylene oxide (and epichlorohydrin), said cyclic monoanhydride is 1,4,5,6,7,7 - hexachlorobicyclo - (2,2,1)-5-heptene-2,3-dicarboxylic acid anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

10. The polyurethane composition of claim 1 wherein said monoether is selected from the group consisting of ethylene oxide, propylene oxide, and 1,2-butylene oxide, said cyclic monoanhydride is tetrahydrophthalic anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

11. The polyurethane composition of claim 1 wherein said monoether is selected from the group consisting of ethylene oxide, propylene oxide, and 1,2-butylene oxide, said cyclic monoanhydride is endocis-bicyclo-(2,2,1)-5-heptene-2,3-dicarboxylic acid anhydride and said polymerization starter is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

12. The polyurethane composition of claim 1 wherein said monoether is selected from the group consisting of epichlorohydrin and epibromohydrin, said cyclic monoanhydride is selected from the group consisting of phthalic anhydride, tetrachlorophthalic anhydride, tetrabromophthalic anhydride, 1,4,5,6,7,7-hexachlorobicyclo-(2,2,1)-5-heptene-2,3-dicarboxylic acid anhydride, tetrahydrophthalic anhydride, and endo-cis-bicyclo - (2,2,1) - 5-heptene-2,3-dicarboxylic acid anhydride and said alkanolamine is a dialkanolamine.

13. The polyurethane composition of claim 1 wherein said monoether is selected from the group consisting of epichlorohydrin and epibromohydrin, said cyclic monoanhydride is selected from the group consisting of phthalic anhydride, tetrachlorophthalic anhydride, tetrabromophthalic anhydride, 1,4,5,6,7,7-hexachlorobicyclo-(2,2,1)-5-heptene-2,3-dicarboxylic acid anhydride, tetrahydrophthalic anhydride, and endo-cis-bicyclo-(2,2,1)-5-heptene-2,3-dicarboxylic acid anhydride and said alkanolamine is a trialkanolamine.

14. The polyurethane composition of claim 1 wherein said monoether is selected from the group consisting of ethylene oxide, propylene oxide, and 1,2-butylene oxide, said cyclic monoanhydride is tetrahydrophthalic anhydride, and said polymerization starter is selected from the group consisting of dialkanolamines and trialkanolamines.

15. The polyurethane composition of claim 1 wherein said monoether is selected from the group consisting of ethylene oxide, propylene oxide, and 1,2-butylene oxide, said cyclic monoanhydride is endo-cis-bicyclo-(2,2,1)-5-heptene-2,3-dicarboxylic acid anhydride, and said polymerization starter is selected from the group consisting of dialkanolamines and trialkanolamines.

16. A composition of matter selected from the group consisting of polymers having the general formulas:

$$(HO-R-Q)_2N(CH_2)_mN(Q-R-OH)_2$$

and

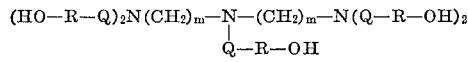

wherein N is a nitrogen atom, R is a saturated lower aliphatic 1,2-alkylene radical having from two to six carbon atoms, OH is a terminal hydroxyl radical, $m$ is an integer having a value of two or three and Q is an ester-ether polymer chain composed of an essentially random arrangement of (X) saturated lower aliphatic radicals of the formula —R—O— wherein R is selected from the group consisting of saturated aliphatic 1,2-alkylene radicals of from two to six carbon atoms and saturated aliphatic 1,3-alkylene radicals of from three to seven carbon atoms and —O— is an oxygen atom, and (Y) cyclic monoanhydride residues of the general formula

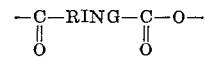

wherein —RING— is a cyclic hydrocarbon radical having from six to twelve carbon atoms and from zero to six halogen substituents selected from the group consisting of chloro and bromo radicals.

17. A composition of matter which is the reaction product of (1) a cyclic monoether selected from the group consisting of saturated lower aliphatic monoepoxides and monooxetanes, (2) a cyclic monoanhydride of an organic dicarboxylic acid selected from the group consisting of aromatic and cycloaliphatic dicarboxylic acids having at least eight carbon atoms and having both carboxylic acid groups attached directly to cyclic hydrocarbon radicals, and (3) a polymerization starter which is a mixture of a saturated aliphatic polyalcohol having from three to six carbon atoms and from three to six hydroxyl radicals with an alkanolamine selected from the group consisting of dialkanolamines and trialkanolamines, with the said alkanolamine comprising at least about 5 percent by weight of the said mixture.

18. The composition of claim 17 in which said (1) is a lower aliphatic monoepoxide.

19. A cured polyurethane composition comprising the cross-linked reaction product of an aromatic organic polyisocyanate having at least two isocyanato groups and a fluid polymer having the general formula $$N(POLYMER\ CHAIN-R-OH)_3$$

wherein N is a nitrogen radical, R is a saturated lower aliphatic 1,2-alkylene radical having from two to six carbon atoms, OH is a hydroxyl radical and POLYMER CHAIN is a polymer chain composed of an essentially random arrangement of (X) saturated lower aliphatic radicals of the structural formula —R—O—, and (Y) cyclic monoanhydride residues of the general formula

wherein —RING— is a cyclic hydrocarbon radical having from six to twelve carbon atoms and from zero to six halogen substituents selected from the group consisting of chloro and bromo radicals, with the mol ratio of said (X) units to said (Y) units varying from 2.0 to about 10 and with at least two of said polymer chains being attached to said nitrogen radical through the carbon atoms of said —R—O— radicals, said polymer having a molecular weight of at least 300, and an acid number of from zero to five and a bulk viscosity of not more than about 200,000 centipoises at 25° C.

20. The composition of claim 19 in which the said saturated lower aliphatic 1,2-alkylene radical is selected from the group consisting of 1,2-ethylene, 1,2-propylene, and 1,2-butylene radicals, and said cyclic hydrocarbon radical is 3,4,5,6-tetrachloro-1,2-phenylene.

21. The composition of claim 19 in which the said saturated lower aliphatic 1,2-alkylene radical is selected from the group consisting of 1,2-ethylene, 1,2-propylene, and 1,2-butylene radicals, and said cyclic hydrocarbon radical is 3,4,5,6-tetrachloro-1,2-phenylene.

22. The composition of claim 19 in which the said saturated lower aliphatic 1,2-alkylene radical is selected from the group consisting of 1,2-ethylene, 1,2-propylene, and 1,2-butylene radicals, and said cyclic hydrocarbon radical is 1,4,5,6,7,7 - hexachlorobicyclo - (2,2,1)-2,3-heptenylene-5.

23. The composition of claim 19 in which the said saturated lower aliphatic 1,2-alkylene radical is selected from the group consisting of 1,2-ethylene, 1,2-propylene, and 1,2-butylene radicals, and said cyclic hydrocarbon radical is 3,4,5,6-tetrabromo-1,2-phenylene.

24. The composition of claim 19 in which the said saturated lower aliphatic 1,2-alkylene radical is selected from the group consisting of 1,2-ethylene, 1,2-propylene, and 1,2-butylene radicals, and said cyclic hydrocarbon radical is bicyclo-(2,2,1)-2,3-heptenylene-5.

References Cited

UNITED STATES PATENTS 3,483,169  12/1969  Case et al. _____ 260—78.4

DONALD E. CZAJA, Primary Examiner

R. W. GRIFFIN, Assistant Examiner

U.S. Cl. X.R.

117—132, 148, 161; 260—2.5, 40, 77.5